UNITED STATES PATENT OFFICE.

EGIL LIE, OF ODDA, NORWAY.

PROCESS OF PRODUCING A PHOSPHORIC-ACID FERTILIZER CONTAINING UREA.

1,275,276.　　　　Specification of Letters Patent.　　Patented Aug. 13, 1918.

No Drawing.　　Application filed May 6, 1918.　Serial No. 232,801.

*To all whom it may concern:*

Be it known that I, EGIL LIE, citizen of Norway, residing at Odda, Hardanger, Norway, have invented a new and useful Improvement in Processes of Producing a Phosphoric - Acid Fertilizer Containing Urea; and I do hereby declare the following to be a full, clear, and exact description of the same.

The present invention has for its object to provide from cyanamids and acid phosphates a phosphoric acid fertilizer containing urea or its derivatives.

It is a well-known fact that urea may be obtained from cyanamids, for instance, from calcium cyanamid by treatment with acids. The drawbacks connected with such a process are obvious and the process is too expensive, especially if the urea is to be used as a fertilizer. Thus an excessive quantity of liquid has to be evaporated, because the reaction necessitates the use of diluted acids.

The present invention consists essentially in this that acid phosphate (either previously prepared or in the form of its components, whereby the acid phosphate is formed simultaneously with the operations during which the urea is formed) is treated with cyanamid in the presence of water.

If the work is carried out in such a manner, the necessity of the evaporation of a large amount of water is avoided and a fertilizer mixture is obtained directly in a state suitable for spreading upon the land. This fertilizer, in addition to containing a large part of its nitrogen in the form of urea, contains phosphoric acid in a water-soluble and in a citrate-soluble state.

If, for instance, mono-calcium phosphate is added to calcium cyanamid, the following reactions may take place:

1: $CaH_4(PO_4)_2 + CaO = 2CaH(PO_4) + H_2O$.
2: $CaH_4(PO_4)_2 + CaCN_2 = 2CaH(PO_4) + H_2CN_2$
3: $H_2CN_2 + H_2O = CO(NH_2)_2$.

Experience has shown that the formation of urea as indicated in equation 3 will take place to a considerable degree, if the conditions are maintained which are the most favorable for the formation of the urea. Thus it has been substantiated that the nitrogen may be transformed nearly quantatively into urea. As free acids will not be present, the formation of well-known dicyanadiamidin compounds, which are poisonous to the plants, is avoided. The presence of water is necessary, and the amount of urea in the product will depend upon the temperature and the time of the treatment. Also, it will depend upon the relative quantities of cyanamid and phosphate used. In carrying out the process these conditions are preferably so combined that the greatest possible formation of urea is obtained and at the same time the formation of the difficultly soluble tri-calcium phosphate is avoided.

Even if a surplus of lime is present, in the calcium cyanamid used, only small quantities of tri-calcium phosphate will be formed even if stored during a long time at ordinary temperature. This also will be true, if the starting material is dicalcium phosphate instead of monocalcium phosphate.

If dicalcium phosphate is added to cyanamid, experience has shown, that the formation of urea may be obtained, if water is simultaneously present, without any considerable reformation of tricalcium phosphate taking place.

If an acid phosphate, for instance monocalcium phosphate contains free phosphoric acid and at least so much calcium cyanamid is added as corresponds to the neutralization of the acid, it will be possible to obtain a product containing urea and also phosphoric acid in the form of a water-soluble monocalcium phosphate. By the use of larger quantities of cyanamid, the phosphoric acid may be obtained in a citrate-soluble state and at the same time the percentage of nitrogen in the mixture is increased.

In the same manner I can add any kind of acid to the phosphate, and at least as much cyanamid as is necessary for the neutralization of the acid.

If desired, I can treat a mixture of phosphate rock (tri-calcium phosphate) and calcium cyanamid together with acid and water, to first form the acid phosphate, which then reacts with the cyanamid, to produce urea-substances.

The calcium phosphate may also be mixed with cyanamid and thereafter acid may be added.

The acid may advantageously be used in a gaseous state, or instead of the acid its anhydrid may be used in the presence of the necessary quantity of water.

In carrying out the process of the invention I can mix the phosphate and cyanamid in any desired proportions, and the percentages of nitrogen and phosphoric acid in the product will depend upon the proportions of the two materials used.

According to the invention I avoid the unfavorable results usually produced when cyanamid is mixed with superphosphate, and in order to illustrate this unfavorable result, and the results obtained by my process, I shall give below some results of comparative experiments:

(A) *Formation of dicyandiamid by mixing together $CaCN_2$ and superphosphate.*

The substances are mixed together without the addition of water or other materials and are allowed to stand without any regulation of the temperature.

| Mixing proportion. | | % of the nitrogen as dicyandiamid after 3 months. |
|---|---|---|
| Superphosphate. | Cyanamid. | |
| Parts. | Part. | |
| 10 | 1 | 40.6 |
| 8 | 1 | 50.0 |
| 7 | 1 | 75.8 |
| 6 | 1 | 69.4 |
| 5 | 1 | 64.7 |
| 4 | 1 | 58.9 |

From this is seen that the formation of dicyandiamid is considerable if the two substances are mixed together and are then left free without control.

(B) *Formation of urea.*

*Influence of addition of water.*

| Mixing proportion. | | | Reaction temperature. | Time. | % of N transformed some days after mixing— | |
|---|---|---|---|---|---|---|
| Superphosphate. | Cyanamid. | Water. | | | Into dicyandiamid. | Into urea. |
| Parts. | Part. | | | Hours. | | |
| 10 | 1 | 0 | 50° C. | 6 | 30.4 | 27.2 |
| 10 | 1 | 1 | 50° C. | 6 | 11.5 | 59.5 |
| 10 | 1 | 2 | 50° C. | 6 | 7.8 | 83.4 |

These experiments verify the preceding ones, the formation of dicyandiamid being considerable if no water is added compared with what takes place if water is added. The reverse condition is true as regards the formation of urea. As expected the latter is increased with the addition of water.

(C) *Formation of urea.*

*Influence of the temperature.*

10 parts superphosphate are mixed with 1 part cyanamid and 1 part water and the temperatures given below are maintained for 6 hours.

| Temp. ° C. | % of N transformed some days after mixing— | |
|---|---|---|
| | Into urea. | Into dicyandiamid. |
| 40 | 55.7% | 14.3% |
| 50 | 59.5% | 11.5% |
| 60 | 72.3% | 9.7% |
| 70 | 95.0% | Traces. |
| 80 | 95.0% | Traces. |

From this is seen that increasing temperature assists in the formation of urea.

(D) *The retransformation of phosphoric acid.*

In this series of tests, 10 parts of superphosphate, 1 part cyanamid and 1 part water were mixed and the mixture held at the temperature indicated below.

| Reaction temperature in ° C. | Time. | % of original citrate+water-soluble $P_2O_5$ citrate-soluble some days after mixing. |
|---|---|---|
| | Hours. | |
| 40 | 6 | 93% |
| 50 | 6 | 85.4% |
| 60 | 6 | 80.0% |

The retransformation into insoluble tricalcium phosphate consequently increases with the temperature.

(E) *The formation of urea, dicyandiamid and the reversion of $P_2O_5$, when $SO_2$ (or $CO_2$) is added to the mixture of cyanamid and superphosphate.*

In these experiments the starting material was a cyanamid already containing some dicyandiamid and urea.

| Mixing proportion. | | | % of $CaCN_2$, nitrogen transformed during the process. | Some days after mixing— | | | |
|---|---|---|---|---|---|---|---|
| Superphosphate. | Cyanamid. | Water. | | Transformed into— | | % $P_2O_5$ water-soluble. | % $P_2O_5$ citrate-soluble. |
| | | | | Dicyandiamid. | Urea. | | |
| Parts. | Parts. | | | | | | |
| 10 | 2 | 1 | 40% | 15.1 | 84.9 | 100.0 | 100.0 |
| 10 | 3 | 1 | 52% | 18.3 | 81.7 | 95.9 | Not determined. |
| 10 | 4 | 1 | 42% | 20.8 | 79.2 | 93.1 | Not determined. |
| 10 | 5 | 1 | 32% | 25.0 | 75.0 | 84.8 | 100.0 |

Similar results are produced by the addition of $CO_2$.

From this is seen that by the addition of $SO_2$ or $CO_2$ it will be possible to obtain most of the $P_2O_5$ in a water-soluble state or all $P_2O_5$ in a citrate-soluble state. At the same time a considerable formation of urea is produced.

By combining the last-mentioned method with those first mentioned at the most favorable temperatures and with the addition of the most favorable amounts of water, it is possible to obtain most of the nitrogen in the form of urea with a small amount only of dicyandiamid, and at the same time practically all of the $P_2O_5$ is obtained in a water-soluble or a citrate-soluble form.

Consequently, if in agriculture—as it has been proposed—cyanamid and superphosphate are mixed together, one would run the risk of a considerable reversion into insoluble $P_2O_5$. Besides, considerable quantities of dicyandiamid and smaller quantities of urea are formed. In such a mixture, when left free without control, the temperature will rise too high and may become uncontrollable; it is obvious that the progress of the reactions taking place is quite uncontrollable.

Thus although it has heretofore been proposed, to mix superphosphate and calcium cyanamid, the present invention represents novelty being a process of producing a new phosphoric acid fertilizer containing a part of its nitrogen in the form of urea. The feature which is characteristic of the process resides in this that the treatment of acid phosphates is so conducted that formation of urea is caused to take place to a greater or less extent, or—stated in another way—a urea containing phosphoric acid fertilizer is produced by treating acid phosphates with cyanamid. The means used to solve this problem consists, as explained above, in causing the treatment to take place in presence of water or under influence of water.

While I have referred particularly to the use of calcium cyanamid, other cyanamid compounds, or cyanamid ($H_2CN_2$) can be employed. In the appended claims, the expression "superphosphate material" is intended to cover ready-formed superphosphate or the materials from which it is to be produced.

I claim:

1. A process of producing a fertilizer containing available phosphoric acid and nitrogen in the form of urea derivatives, said process comprising mixing a cyanamid, superphosphate material and water, and allowing the mixture to react, whereby the nitrogen of the cyanamid is connected largely into urea compounds.

2. A process which comprises mixing a cyanamid, superphosphate and water, and adding an acid anhydrid thereto.

3. A process of making fertilizer which comprises mixing phosphate, acid, a cyanamid and water, and allowing the mixture to react.

In testimony whereof, I have signed my name to this specification in the presence of two subscribing witnesses.

EGIL LIE.

Witnesses:
N. GIEBSON,
GISLE BALEL.